3,002,940
STYRENE-BUTADIENE LATEX PAINT CONTAINING SOLUBLE AND INSOLUBLE THICKENER RESINS AND SUSPENDING AGENTS
John A. Holloway, Lakewood, Ohio, assignor to The B. F. Goodrich Company, New York, N.Y., a corporation of New York
No Drawing. Filed May 16, 1956, Ser. No. 585,137
7 Claims. (Cl. 260—17.4)

The present invention relates generally to water base paints; more specifically the persent invention relates to water base paints containing a novel thickening agent.

Water base paints have become the most popular type of indoor home wall finishing materials because of their ease of application, their quick drying characteristic, excellent covering power, and the great ease of cleaning brushes, rollers, etc. in ordinary water. Such paints usually contain as principal ingredients a high styrene butadiene copolymer resin latex, rubber latex, chlorinated rubber dispersion, acrylate emulsion, and the like, as the binder material, suspended or dispersed pigments and a thickener such as casein or other protein or carboxymethyl cellulose, methyl cellulose or other cellulose derivatives. While such paints have enjoyed wide use and large volume sales, they suffer from certain shortcomings such as poor drip and flow (sag) resistance, bacterial attack on the casein thickeners, poor pigment dispersion (poor tinctorial power), inadequate pigment suspension stability (settling of pigment) and poor brushability of the paints thickened with the synthetic cellulose thickeners. There exists a need for a paint having the brushability of a casein thickened paint, freedom from bacterial attack, and greatly improved pigment suspension stability.

In accordance with the present invention it has been found that a superior water base paint can be produced by combining a dispersion of a binder material such as a resin or a rubber, pigments, and a small proportion of a thickener/emulsifier/suspending agent comprising (1) a derivative, as defined below, of certain water-insoluble but highly hydrophilic interpolymers made from monomeric mixtures containing an alpha-beta-unsaturated carboxylic acid anhydride such as maleic inhydride and (2) a water-soluble derivative of a polymer of an unsaturated carboxlyic acid or anhydride, components 1 and 2 being present in ratios defined below. Such a paint has a number of outstanding advantages over casein or cellulose-thickened paints including (1) resistance to bacterial and fungal attack, (2) better sag and drip resistance, (3) better stability on prolonged storage (i.e. pigments do not settle out in the can), (4) improved pigment dispersion (which results in deeper colors with the same amount of pigment), (5) better leveling and brushability, (6) less odor because antioxidants, bactericides and fungicides can be reduced or eliminated, and (7) ease of preparation.

The thickening/suspending/emulsifying agent of this invention is unique in that the two resinous components combine to form, in spite of the small proportions employed, a light, thixotropic gel structure in the paint which does a better job of holding the binder dispersion and the dispersed pigments in suspension. When subjected to mild agitation with a paint paddle, however, the gel structure is readily broken down and the desired fluidity for application by brush, roller or spray gun is restored. Since the synthetic resinous thickener is not a nutrient, it is not subject to attack by bacteria or fungi and it is not necessary to employ odor-imparting chemicals to stabilize the thickener. A further advantage is the ability to add the mixed, dry resins to the dry pigments before the later are ball milled or ground in water.

As noted above, only a small amount of the thickener-emulsifier-suspending agent need be employed. As little as 0.1 percent of the composite thickener of this invention will be noticed in improved properties. Usually, however, from about 0.15 to about 2.0 percent by weight, based on the total weight of paint, will be sufficient. For special purposes, larger amounts ranging from about 2 to 10 percent or more may be employed. The exact proportion required will depend on a number of factors including (1) the particular paint formulation and (2) the particular viscosity characteristics of the resins themselves.

The insoluble, highly hydrophilic component of the thickener of this invention does not dissolve in water or in organic solvents. In water or aqueous alkali it swells to hundreds of times its original volume to form highly hydrated gels. When mixed by stirring, the gel is easily dispersed in excess water to form highly viscous mucilaginous compositions in which solids and liquids may be dispersed and suspended with ease. The insoluble polymeric derivative is of a type disclosed in the copending application of John F. Jones, Serial No. 404,784, filed January 18, 1954. These materials are the monovalent alkaline salt forms of partial esters and partial amides of basic interpolymers made from monomeric mixtures containing at least three essential monomers, one being an alpha-beta unsaturated polycarboxylic acid anhydride, such as maleic anhydride, another being a monoolefinically-unsaturated comonomer such as methyl vinyl ether, and the third is a cross-linking agent containing a plurality, i.e. more than two, polymerizable $CH_2{=}C{<}$ groupings per molecule, such as the polyalkenyl polyethers of polyhydroxy compounds. The basic interpolymers do not, per se, possess appreciable thickening, suspending and emulsifying power and the same is true of many of the straight salts of the basic interpolymers. The partial esters, the partial amides or partial ester-partial amide forms, when converted to the salt form, have tremendously increased thickening power, and have in addition the power to emulsify and suspend water-immiscible organic liquids and finely-divided water-insoluble and hydrophobic organic and inorganic solids such as fillers, organic and inorganic coloring pigments, carbon black, waxes, resins, rubbers, and others, forming therewith stable and very viscous mucilaginous compositions in water or other aqueous media.

Polycarboxylic acid anhydrides which are most useful in the production of the basic interpolymers have the general structure

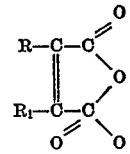

wherein R and R' are selected from the class consisting of hydrogen, halogen and the cyanogen (—C≡N) groups and alkyl, aryl, alkaryl, aralkyl, and cycloaliphatic groups. Illustrative anhydrides of this structure include maleic anhydride itself, chloromaleic anhydride, dimethylmaleic anhydride, diphenylmaleic anhydride, dibenzylmaleic anhydride, di-(p-methylphenyl)maleic anhydride, dicyclohexylmaleic anhydride, and others. Maleic anhydride, because of its ready availability, low cost and highly satisfactory performance, is the preferred anhydride.

The maleic anhydride type monomers exhibit a strong tendency to form alternating interpolymers. Reaction at good rates and to high conversion is obtained only when a comonomer or comonomers are present in approximately molar quantities. The total of the monoolefinic monomer (i.e. the alternator) plus the amount of the cross-linking agent should therefore substantially equal the amount of anhydride on a molar basis. Monomers that readily form alternating interpolymers of high molecular weight range from monoolefinic hydrocarbons such as ethylene, isobutylene, styrene and the like to esters, amides, ethers, acids, ketones, vinyl and vinylidene halides and cyanides such as vinyl chloride, vinylidene chloride, acrylonitrile, vinylidene cyanide, vinyl esters such as vinyl acetate and vinyl laurate, alkyl vinyl ethers, preferably those containing from 3 to 6 carbon atoms, such as methyl vinyl ether, ethyl vinyl ether, propyl vinyl ether, butyl vinyl ether, vinyl 2-ethylhexyl ether, and others, acrylamide, acrylonitrile, ethyl acrylate, methyl methacrylate, acrylic acid, methyl vinyl ketone, and many others. In many cases the monoolefinic monomer will increase or decrease the hydrophilic properties of the resulting derivatives. For example, alkyl vinyl ethers, vinyl acetate and acrylamide increase the sensitivity to water while hydrocarbons such as styrene and isobutylene decrease it. For the latter reason, and because they are most stable to hydrolysis, the alkyl vinyl ethers (3 to 6 carbon atoms) are preferred. When using the latter, up to about 20 mol percent of the total monomers may comprise one or more other monomers.

The third essential monomeric ingredient may be any polymerizable material which contains a plurality of (i.e. an average of more than two per molecule) polymerizable $CH_2=C<$ groupings and which is reactive with the anhydride and the monoolefinic alternator comonomer or comonomers. Thus, the cross-linking monomer may include polyunsaturated hydrocarbons and polyunsaturated acids and acid anhydrides, ethers, ketones, alcohols, and other polyunsaturated compounds of this type including, by way of example, polyunsaturated hydrocarbons such as trivinyl benzene and trivinyl naphthalene; solvent-soluble forms of polymerized dienes such as polybutadiene or polyisoprene; unsaturated sulfones such as hexallyl trimethylene trisulfone; unsaturated amides such as trimethacrylyl triazine; and polyunsaturated ethers such as the 1,4,5,8-naphthalene tetrol allyl ethers, the vinyl, allyl, methallyl and crotyl polyethers of polyhydroxy compounds containing from 2 to 7 or more alkenyl ether groupings per molecule and others.

A preferred class of cross-linking agents, because of their ability to produce insoluble interpolymers resistant to hydrolysis are selected from the class consisting of polyunsaturated hydrocarbons, solvent-soluble, polymeric open-chain aliphatic conjugated dienes such as polybutadiene or polyisoprene, and polyalkenyl polyethers of polyhydric alcohols containing at least 4 carbon atoms and at least 3 hydroxyl groups, all of which contain an average of more than two polymerizable $CH_2=C<$ groupings per molecule, the double bonds of which are not in conjugated relationship one with the other. Many illustrations of this preferred class are disclosed above. The amount of cross-linking agent can vary from about 0.01 percent to about 5 percent by weight of the remaining monomers, the preferred proportions of the preferred cross-linking agents being of the order of 0.1 or 0.2 percent to 2.5 percent. The polyalkenyl polyether type of cross-linking agent, such as the polyallyl ether of sucrose, are preferably employed in amounts from 0.2 to 1.5 percent. The use and preparation of the latter is described in greater detail in the copending application of Harold P. Brown, Serial No. 307,711, filed September 3, 1952, now United States Patent No. 2,798,053, issued July 2, 1957. The polymeric diene cross-linking agents, their preparation and their uses are described in greater detail in the copending application of Harold P. Brown and Richard G. Bauman, Serial No. 405,659, filed January 22, 1954, now U.S. Patent No. 2,858,736.

The basic interpolymers can be made in any conventional manner such as polymerization in mass, in solvent or in aqueous emulsion. Best results are obtained by a solvent/non-solvent process whereby the monomers are polymerized in a solvent or diluent in which the monomers are soluble but in which the interpolymer is insoluble. The product, in such a case, is obtained as a slurry of a finely-divided solid interpolymer which is usually sufficiently fine for use as is. The polymer is dried and reground, if necessary, so as to be finer than about 100 mesh (U.S. standard), and more preferably finer than about 325 mesh.

The basic interpolymer is then treated with an alcohol to produce a partial ester, or with an amine to form a partial amide, after which it is partially or completely neutralized to form the salt. In the esterification or amidization, there is a strong tendency to form the half ester or half amide. Quite severe conditions, involving the use of catalysts, higher temperatures and a large excess of reagent are required to form an appreciable proportion of the diester or diamide derivatives, especially with the higher alcohols and higher amines. The reaction to form the partial ester or partial amide is generally conducted in a diluent medium, at temperatures of 100° C. or lower, more preferably at 50 to 80° C. The esterification reaction is facilitated by a small amount of a strongly alkaline amine such as pyridine, or other alkaline catalyst. When it is desired to convert substantially all of the anhydride groups to the half ester, which is not necessarily desirable in all cases, a fairly large excess of up to 2 or 3 equivalent proportions of alcohol is required.

The partial amide is much more easily formed, the interpolymers tending to form an amide-salt directly when one equivalent of amine for every equivalent of anhydride is employed. When the half-amide is desired not more than a 25 percent excess of amine is desirable. Heating facilitates the reaction at 25 to 100° C. and likewise the use as an inert diluent of an organic solvent such as benzene, toluene, hexane, etc. which has a slight tendency to swell insoluble interpolymer. Liquid aromatic hydrocarbons are the preferred diluents for both the esterification and amidization reactions.

Any alcohol or amine can be utilized, although to prevent additional cross-linking (which may result in deswelling or loss of hydrophilic properties) by transesterification and/or diamide formation, it is preferred to utilize an alcohol or amine containing not more than one free hydroxyl or amino group. The lower monohydric alcohols and monobasic amines produce more highly hydrophilic derivatives, while the higher members produce derivatives having higher viscosity and greater emulsifying and suspending power, particularly for water-immiscible organic liquids. In general, aliphatic and cycloaliphatic alcohols containing from 1 to 18 carbon atoms and primary and secondary amines, not necessarily aliphatic in nature, containing from 1 to 18 carbon atoms may be utilized. Illustrative alcohols include methyl, ethyl, propyl, n-butyl and sec-butyl, hexyl, octyl, 2-ethylhexyl, decyl and lauryl, myristyl, octadecyl, cyclohexyl and others. Illustrative amines include ammonia, methyl through octadecyl (mono- and di-) amines, cyclohexyl amine, dilauryl amine, aniline, monomethyl aniline, naphthylamine, o-toluidine, diphenyl amine, benzyl amine, sulfanilic acid, guanidine, pyrrole, piperidine and many others.

The viscosity (thickening) and suspending and emulsifying action first increases with percent esterification and/or percent amidization, and then decreases as the full half-ester or half-amide (i.e. 50% of the anhydride linkages opened by reaction with the alcohol or amine) is approached, the maximum usually occurring somewhere in the region of 5 to 40 percent.

Likewise, conversion to the salt form involves the use of a monovalent alkaline hydroxide or salt such as any of the alkali metal hydroxides and ammonia, sodium bicarbonate, sodium acetate, sodium chloride, potassium carbonate, anhydrous or aqueous ammonia, and the like. It is preferred that no appreciable quantity of polyvalent metal ions be introduced due to their powerful deswelling action. Sequestering or chelating agents sometimes can be employed to prevent this loss of thickening effect. Maximum viscosity and maximum suspending and emulsifying action usually occur at a degree of neutralization somewhat short of completion, although this effect can sometimes be balanced against percent esterification or amidization to secure the desired properties. It is sometimes desirable to first swell or soak the basic partial ester or amide in water or an alkaline aqueous medium and then agitate or disperse before completing the neutralization or adding other ingredients. Equally satisfactory is the dry mixing of dry granular interpolymer and dry granular neutralization agent, which mixture is subsequently added to water for in situ neutralization and dispersion.

The water-soluble component of the thickening agent may be any water-soluble salt of a carboxyl-containing polymer having sufficiently high molecular weight to have an appreciable thickening effect. Polyacrylic acid of a wide range of molecular weights, when partially neutralized with a monovalent alkali, forms a high viscosity solution in aqueous media. Similaly, partially or completely hydrolyzed polyacrylonitrile forms a water-soluble material containing carboxyl groups and/or acrylamide groups, which when neutralized, is a good thickener. Likewise, copolymers of maleic anhydride and vinyl acetate, when treated with alkaine aqueous media, go into solution and have a fair thickening action. Thus, any polymer or copolymer containing at least 50 mol percent of an alpha-beta olefinically-unsaturated acid or acid anhydride can be employed. Like the insoluble derivative described above, the soluble salt can be prepared by mixing the solid, carboxyl form of the polymer with a dry neutralizing agent, by adding the carboxyl form of the polymer to an alkaline solution, or by hydrolyzing an ester or nitrile in caustic.

The ratio of soluble salt to insoluble salt, in the thickener of this invention, can be varied from about 10:1 to about 1:5, although for best results the ratio should be from about 5 parts of soluble to one part of insoluble to as little as 1:4, with about 3:1 to about 1:3 being most preferred, all on a weight basis.

When a paint is thickened by either salt alone, a phase separation occurs. For example, when the cross-linked polymer derivative is employed above difficulty in dispersing the thickener in the paint formulation is sometimes encountered, a phase separation occurs where the latex portion separates from the remainder, and a thick gel (difficult to redisperse by hand stirring) sometimes occurs in the can on prolonged storage. When the soluble type of polymeric salt is employed alone, the latex portion of the paint is separated out or "creamed" as a separate top layer. In both cases of separate use the brushability or leveling power of the paint is badly deficient. When both are utilized in the above range of proportions, however, phase separation does not occur, and it is noted that a considerable improvement in brushability and leveling power occurs (equivalent to or superior to casein in some cases).

In the preparation of the paint conventional paint mixing equipment and technique can be employed. For example, the pigment portion of the paint formulation is first ground in water in a pebble mill and an aqueous solution-dispersion ("let down") containing the binder latex or dispersion, the preservative (if any), antifoam agent or agents (if any) and the thickener of this invention is then added to the pigment grind while rapidly agitating the latter. A smooth dispersion results. If desired, the dry, finely-divided carboxyl forms of the thickening resins can be blended in the proper ratio with sufficient of a dry neutralization agent and the resulting dry mix added in proper proportion to the dry pigments. When the latter are ground in water, a most efficient pigment suspension results to which the other ingredients are then added.

For the preparation of the paint a thickener should not be used in which the insoluble salt has once been swollen in water and then deswollen, especially in the form of the salt. When an insoluble salt-carboxylate of this type is once swollen in water, it is converted to a gel which after drying must be reground. When the reground gel is reswollen in water, the particles retain their identity and do not completely coalesce with the result that a grainy mucilaginous composition results. Further, the mucilage containing the twice-swollen insoluble salt has greatly reduced viscosity. It is for this reason that the use of a dry mix of dry carboxyl-form resins and dry neutralization agent, which does not interact under normal conditions, is so convenient and permits the development of maximum thickening and suspending and emulsifying action under all conditions.

The thickener of this invention can be employed in any water-based paint or coating composition formulation. For example, as mentioned above, the paint formulation can include any synthetic polymer as the binder material such as the common high styrene copolymer (copolymer of 60 to 67% styrene and 33 to 40% butadiene) latex, rubber latex, chlorinated or hydrochlorinated rubber latex, neoprene latex, styrene/acrylonitrile copolymer latex, polyacrylate ester latex, polymethacrylate ester latex, an emulsion or dispersion of a liquid alkyd coating resin, a polyester emulsion or dispersion such as any of the air-curing or drying oil-modified alkyds and polyesters including the styrenated and diallyl phthalate-containing types, emulsions of drying oils, emulsions of polyalkenyl polyethers of polyhydroxy compounds with or without other comonomers and/or air-blown products of this type, solvent solutions of resins, gums, etc., vinyl resin latices such as any of the polymers and interpolymers of vinyl and vinylidene chloride, and many others. Water-soluble resins can be utilized employing the thickener of this invention to stabilize and suspend pigments, plasticizers and the like.

The invention will now be described in connection with several specific examples which are intended to be illustrative only.

EXAMPLE I

In this example a cross-linked interpolymer prepared by polymerization in benzene with benzoyl peroxide catalyst of an approximately equimolar mixture of maleic anhydride and methyl vinyl ether with 1 part by weight per 100 parts by weight of the other two monomers of a polyallyl sucrose containing an average of 5.6 to 5.8 allyl groups per molecule. The polymerization proceeds at 50 to 100° C. to a thick slurry of very fine solid polymer particles. Sufficient methanol or diethyl ethanolamine is added directly to the polymerization slurry, together with a catalytic amount of pyridine to serve as a catalyst, and heating and agitation continued until a solid, finely-dispersed product is obtained in which about 85 percent of the anhydride rings have been opened by esterification in the case of the methyl ester or 30 percent in the case of the diethylaminoethanol ester. The product slurry is then filtered, the filter cake washed with fresh benzene and then dried. At this point particles larger than 100 mesh, if any, should be removed by screening to avoid a grainy condition in the dispersion.

Another resin is prepared by polymerizing acrylonitrile in aqueous emulsion to produce a fine particle size latex of a moderately high molecular weight polyacrylonitrile. A theoretical quantity of sodium hydroxide or potassium hydroxide is added directly to the latex and heat is applied to hold the charge at about 80° C. Heating is continued for a time after the latex-like milkiness has disappeared indicating the solid latex particles have reacted and gone into solution forming a moderately viscous, clear solution containing about 20 percent total solids by weight. Analysis reveals that the product is essentially sodium or potassium polyacrylate plus some acrylamide groups indicating hydrolysis is not complete. The resulting solution is then neutralized with aqueous ammonium hydroxide to a pH in the range of 3.5 to 11, more preferably 5 to 10. In this example the mucilage is neutralized to a pH of about 5.6 and diluted to a concentration of about 5 percent. The solution of soluble sodium or potassium salt of hydrolyzed polyacrylonitrile is then added to the resulting mucilage in a ratio between 3:1 to 1:3 (soluble/insoluble). The mixed solution is then added to the paint "let down" described below.

A pigment dispersion is then prepared by placing the following materials in a horizontal pebble mill:

Material: Parts/wt.
(1) Titanium dioxide ("Titanox RANC")__ 74.4
(2) Water ground mica_____ 74.4
(3) Toluidine red_____ 5.6
(4) Distilled water_____ 103.0
(5) Potassium tetrapolyphosphate_____ 0.7

This mixture is ball milled overnight until the desired degree of dispersion had been obtained.

A paint "let-down" is prepared from the following materials:

Material: Parts/wt.
Distilled water_____ 34.0
Butadiene styrene latex [1]_____ 174.0
Fungicide and/or germicide_____ 0.75
Antifoamer _____ 0.75
Thickener (varied as to type and amount).[2]

[1] "Dow 512K" Latex (copolymer of 60% styrene/40% butadiene).
[2] In the case of the thickeners of this example added as the neutralized mucilage.

Portions of the latter mixture, which is of a thick creamy consistency due to the high concentration of thickener, are blended into portions of the more fluid pigment grind to form a smooth paint suitable for outdoor exposure on masonry. The blending is accomplished by a simple propeller type rotary agitator. Paints are made in this fashion employing several different thickeners of this invention, from casein, from methyl cellulose and from carboxymethyl cellulose. The casein thickener is prepared as a 15 percent solution by dissolving casein powder in distilled water, adding $NH_4OH$ to a pH of 8.0 and then heating at 170° F. for 45 minutes. The thickening agents employed are as follows:

(1) Casein (2 percent on total weight of paint).
(2) Ammonium salt of diethylethanolamine ester (30 percent of anhydride linkages broken) plus potassium salt of hydrolyzed polyacrylonitrile in ratio 1:2, respectively and employing 0.12 percent on the total weight of paint of the composite thickener.
(3) Similar to (2) but 1:1 ratio.
(4) "Methocel" (400 cps. methylcellulose) 2.0 percent based on paint solids.

The fresh paints are tested for viscosity and thixotropic breakdown on the Brookfield "Synchro-lectric" Viscosimeter at 10 r.p.m. and 100 r.p.m. By this test the viscosity of the fresh paint is determined at 10 r.p.m., then the viscosimeter rotor is run at 100 r.p.m. for one minute, the rotor slowed to 10 r.p.m. and the viscosity taken again. Similarly yield values are determined from viscosity values taken at 0.5 and 1.0 r.p.m. by calculation $Y = \frac{1}{100}(V_{0.5} - V_{1.0})$ where Y is the yield value in dynes/cm.² and $V_{0.5}$ and $V_{1.0}$ are the viscosities in centipoises at 0.5 and 1.0 r.p.m., respectively. The paints are also tested and evaluated by drawing a film onto smooth paper by means of a notched bar drawn through a pool of paint and then across the paper. The degree to which the ridges of paint made by the notches leveled out after the paint dried is taken as a measure of both leveling and brushability. The paints are ranked by a numerical system using the casein-thickened paint as the standard ranked as (1) and decreasing values being indicated by the size of the number. The "can stability is evaluated by sealing the paint in paint cans and storing with periodic viscosity determination and observation of the amount of pigment settling, pigment caking and phase separation. The data are as follows:

| Thickener | 10 r.p.m. | 10 r.p.m. after 100 r.p.m. | Percent Thixotropic Breakdown | Leveling Rank | Can Stability |
|---|---|---|---|---|---|
| Casein (1)_____ | 1,500 | 1,035 | 31 | 1 | Fair to good. |
| Methocel (4)___ | 1,800 | 1,720 | 4.4 | 5 | Do. |
| (2) above_____ | 1,360 | 1,208 | 11.2 | 2 | Excellent. |
| (3) above_____ | 1,880 | 1,760 | 6.4 | 2 | Do. |

In the above data, the thickener of this invention shows no separation of phases or pigment settling whereas with casein there is a thin, clear layer at the top of the paint after standing for several days, and there is a noticeably heavier concentration of pigment at the bottom of the can (considered fair to good nevertheless). As regards "Leveling Rank," the casein paint is considered just slightly better than either of the paints of the example though the differences are small and both of the latter are perfectly satisfactory commercial materials in this regard. The "Methocel" thickened paint is not nearly as satisfactory, especially for amateur home use. It is noteworthy that as little as 0.12 percent of the resinous thickener is equal to or superior to 2 percent casein, or methylcellulose, in suspending power, an increase of almost 20 times in thickening and suspending efficiency.

EXAMPLE II

Whereas Example I employs an outdoor masonry formulation, in this example the thickeners of this invention are incorporated in an indoor wall finish material employing the following standard formulation:

Pigment grind: Parts/wt.
Titanium dioxide_____ 765
Calcium carbonate_____ 500
ASP 400 clay_____ 250
Diatomaceous silica_____ 125
Potassium tetrapolyphosphate_____ 7.5
Distilled water_____ 1150
Toluidine red pigment_____ 110

*Paint let-down*

Pigment dispersion (above)_____ 261
Binder latex [1]_____ 153
Antifoaming agent [2]_____ 0.8
Fungicide-germicide (20% sol.)_____ 12.4
Thickener _____ Varied

[1] Dow latex 762K (copolymer of 67% styrene/33% butadiene).
[2] "El Dorado ED" (a commercial defoamer, made by The El Dorado Oil Works, Oakland, California, and said to be an ester of a polyhydroxy compound such as pentaerythritol and a 2-18 carbon atom monocarboxylic acid such as is described in U.S. Patent No. 2,686,766).

In the above formulation casein (2 percent) is employed in a standard control formulation by way of comparison. The thickener of this invention comprising the ammonium salt of the diethylethanol amine partial ester of a maleic anhydride/methyl vinyl ether cross-linked with 1 percent polyallyl sucrose and the potassium salt of hydrolyzed polyacrylonitrile is employed as follows:

(1) 0.12% of the above, on the total weight of paint, with soluble:insoluble ratio of 1:1
(2) 0.17% of the above, with ratio of 3:1

The resulting paints are tested after 2 days and after 75 days aging in the can. The brushability and leveling power of all three experimental paints are equivalent to a casein paint at both the 0.12 percent and 0.17 percent thickener concentration levels and at both ratios of 1:1 and 3:1. Over the course of a 75 day period both of the experimental paints appear to be completely stable.

In both the experimental paints the suspension stability is rated as excellent, showing a noticeable improvement over the casein-thickened paint. Again the nearly 20-fold increase in thickening efficiency is clearly demonstrated.

EXAMPLE III

In this example, indoor paints similar to those above are prepared using 0.12 to 0.17 percent of a number of soluble and insoluble salt-type thickeners of this invention, each used alone. The following are employed:

(1) The insoluble ammonium salt of the diethylamino ethanol partial ester of the previous examples.
(2) An ammonium salt of a partial methyl ester (85 percent of anhydride linkages opened) as described in Example I.
(3) Ammonium salt of a partial lauryl ester (9 percent of anhydride linkages opened).
(4) An ammonium salt of partial amide prepared by reacting the interpolymer of Example I with ½ equivalent of guanidine.
(5) An ammonium salt of a partial amide prepared by reacting the interpolymer of Example I with two equivalents of dipyridyl amine.
(6) Similar to (5) but the partial amide of 2-aminopyridine prepared using 1 equivalent of the amine.
(7) The potassium salt of hydrolyzed polyacrylonitrile (Ex. I).

The paints are evaluated as described in Example I. In every case, except the casein-thickened paint, the binder latex separated, or creamed out and the leveling and brushability characteristics rated from 3 to 5 (see Ex. I) showing the necessity for the use of both soluble and insoluble types.

EXAMPLE IV

The experiments of Example III are repeated, this time adding the companion soluble or insoluble salt, as the case may be, in ratio 3:1 or 1:1 ratio. The amount of each thickener is either 0.12 percent or .17 percent on the total weight of paint. In all cases where the ratio of soluble/insoluble is above 1:1 the brushability and leveling characteristics and suspension stability are equal to or superior to casein. No creaming or binder latex separation could be noted in any of the experimental paints.

EXAMPLE V

When a paint similar to that of Example I is prepared using the soluble potassium polyacrylate and insoluble ammonium salt of the partial diethylaminoethanol ester in a ratio of 10:1 (at a level of 0.2 percent total) a paint is produced that has excellent leveling and brushability and good pigment dispersion. On shelf storage, however, the suspension stability is rated as only fair, though still superior to that obtainable with many synthetic cellulose derivatives. Similarly when the ratio is 1:3 or 1:5, the brushability and leveling power of the paint is reduced, although still acceptable for some applications.

While there has been disclosed certain preferred manners of performing the invention, it is not desired or intended to be limited thereby, for the precise proportions of the materials utilized may be varied and equivalent chemical materials may be employed, if desired, without departing from the spirit and scope of the invention as defined in the appended claims.

I claim:

1. A latex paint comprising an aqueous dispersion of a synthetic copolymer of 60 to 67% styrene and 33 to 40% butadiene as a binder material thickened and suspension-stabilized with from 0.1 to about 2% by weight, based on the total weight of said paint, of a mixture comprising (1) an insoluble monovalent salt of a member of the class consisting of a partial ester and a partial amide of an anhydride interpolymer in which from about 5 to about 50% of the anhydride has been neutralized by reaction with a member of the class consisting of monohydric alcohols and monoamines containing from 1 to 8 carbon atoms, said interpolymer being prepared by the polymerization of a monomeric mixture containing (a) an alpha-beta unsaturated polycarboxylic acid anhydride of the formula

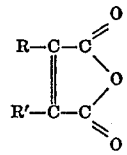

wherein R and R' are selected from the class consisting of hydrogen, halogen, cyanogen group, alkyl groups, aryl groups, alkaryl groups, aralkyl groups and cycloaliphatic groups, (b) a vinyl alkyl ether copolymerizable with said anhydride, and (c) 0.01 to 5% by weight based on the total of (a)+(b) of a cross-linking agent copolymerizable with (a), (b) and containing more than two

groups per molecule in non-conjugated relationship said cross-linking agent being a member of the class consisting of polybutadiene, polyisoprene, and polyalkenyl polyethers of polyhydric alcohols, which contain at least 4 carbon atoms and at least 3 hydroxyl groups the molar proportions of (b)+(c) being approximately equal to that of (a), and (2) a water-soluble monovalent salt of a polymer containing at least 50 mol percent of polymerizable alpha-beta olefinically-unsaturated carboxylic acid, said (1) and said (2) being present in said paint in the ratio of between 10:1 and 1:5.

2. A latex paint comprising an aqueous dispersion of a copolymer of 60 to 67% styrene and 33 to 40% butadiene as binder material, suspended solid pigments, and from about 0.15 to 2% by weight of a composite thickening-suspending agent comprising (1) an insoluble monovalent alkali salt of a partial ester of an anhydride interpolymer which has been esterified to the extent of from about 5 to 40% by reaction with diethylaminoethanol, said interpolymer being prepared by the polymerization of a monomeric material containing (a) maleic anhydride, (b) methyl vinyl ether, and (c) from 0.2 to 1.5% by weight of (a)+(b) of a polyallyl ether of sucrose containing an average of from 5.6 to 5.8 allyl groups per molecule, the molar proportion of (a) being approximately equal to that of (b)+(c) and (2) a water-soluble, monovalent alkali salt of a hydrolyzed polyacrylonitrile, said soluble and said insoluble salts being present in the said paint in a weight ratio between 3:1 to 1:3.

3. A latex paint as defined in claim 1 wherein said ratio is from 5:1 to 1:4.

4. A latex paint comprising an aqueous dispersion of a synthetic copolymer of 60 to 67% styrene and 33 to 40% butadiene as a binder material, suspended solid pigments, and from about 0.15 to 2% by weight of a composite thickening-suspending agent comprising (1) an insoluble monovalent salt of a partial ester of a 1 to 18 carbon atom monohydric alcohol and an insoluble interpolymer of (a) maleic anhydride, (b) an alkyl vinyl ether containing from 3 to 6 carbon atoms, and (c) from 0.2 to 1.5% by weight based on the total weight of (a)+(b) of a polyalkenyl polyether of a polyhydroxy compound containing at least 3 hydroxyl groups and 4 carbon atoms per molecule, said polyalkenyl polyether containing more than 2 and up to 7 alkenyl ether groups per molecule in non-conjugated relationship, each of said alkenyl ether groups containing the structure CH₂=C< and not more than 4 carbon atoms per said ether group, the molar proportions of (a) being approximately equal to and those of (b)+(c) and (2) a water-soluble monovalent salt of a polymer containing at least 50 mol percent of an alpha-beta olefinically unsaturated acid, said soluble and said insoluble salts being present in said paint in the ratio of from 10:1 to 1:5, and the said partial ester being one in which from about 5 to 50% of the said interpolymer anhydride content has been esterified.

5. A latex paint as defined in claim 4 wherein the said insoluble salt is a salt of a partial amide of the defined interpolymer wherein from about 5 to about 50% of the anhydride linkages had been opened by reaction with a 1 to 18 carbon atom monoamine.

6. A latex paint as defined in claim 4 wherein said insoluble salt is a salt of hydrolyzed polyacrylonitrile.

7. A latex paint comprising an aqueous dispersion of a copolymer of 60 to 67% styrene and 33 to 40% butadiene, as a binder material, suspended solid pigments, and from about 0.15 to 2% by weight of a composite thickening-suspending agent comprising (1) an insoluble monovalent alkali salt of a partial ester of an anhydride polymer which has been esterified to the extent of from about 5 to 40% by reaction with a 1 to 18 carbon atom monohydric alcohol, said interpolymer being prepared by the polymerization of a monomeric material containing (a) maleic anhydride, (b) methyl vinyl ether, and (c) from 0.2 to 1.5% by weight of (a)+(b) the molar proportion of (a) being approximately equal to that of (b)+(c) of a polyalkenyl polyether of a polyhydroxy compound containing at least 3 hydroxyl groups and at least 4 carbon atoms per molecule, said polyether containing more than 2 and up to 7 alkenyl ether groups per molecule in non-conjugated relationship, each of said alkenyl ether groups containing the linkage $CH_2=C<$ and not more than 4 carbon atoms per group, and (2) a water-soluble, monovalent alkali salt of a polymer containing over 50 mol percent of acrylic acid, said soluble and said insoluble salts being present in the said paint in a weight ratio between 3:1 to 1:3.

References Cited in the file of this patent

UNITED STATES PATENTS

| | | |
|---|---|---|
| 1,976,679 | Fikentscher et al. | Oct. 9, 1934 |
| 2,490,677 | Cupery | Dec. 6, 1949 |
| 2,621,169 | Robinette et al. | Dec. 9, 1952 |
| 2,798,053 | Brown | July 2, 1957 |
| 2,864,803 | Jones | Dec. 16, 1958 |

FOREIGN PATENTS

| | | |
|---|---|---|
| 632,174 | Great Britain | Nov. 17, 1949 |

OTHER REFERENCES

Payne: "Paint, Oil & Chemical Review," October 22, 1953, pages 14–49.

UNITED STATES PATENT OFFICE
CERTIFICATE OF CORRECTION

Patent No. 3,002,940            October 3, 1961

John A. Holloway

It is hereby certified that error appears in the above numbered patent requiring correction and that the said Letters Patent should read as corrected below.

Column 1, line 44, for "inhydride" read -- anhydride --; column 2, line 1, for "later" read -- latter --; column 5, line 24, for "Similaly" read -- Similarly --; column 8, line 3, after "stability" insert a quotation mark.

Signed and sealed this 24th day of July 1962.

(SEAL)
Attest:

ERNEST W. SWIDER            DAVID L. LADD
Attesting Officer            Commissioner of Patents